United States Patent [19]
Stone, Jr. et al.

[11] 3,810,246
[45] May 7, 1974

[54] REELABLE MAGNETIC TAPE HAVING EDGE MARKED CUE INDICIA FOR DIRECT VIEWING IN THE REELED CONDITION

[75] Inventors: Wayne B. Stone, Jr., Bethesda, Md.; Alan Beaumont, Stamford, Conn.

[73] Assignee: Indexette Tapes, Inc., New York, N.Y.

[22] Filed: Nov. 17, 1971

[21] Appl. No.: 199,475

[52] U.S. Cl. .............................360/134, 352/236
[51] Int. Cl......................... G11b 5/78, G11b 27/34
[58] Field of Search179/100.2 B, 100.2 A, 100.2 E, 179/100.2 Z, 100.2 R; 352/92, 236; 33/128; 274/41.4; 40/309; 283/18; 116/DIG. 14, 124 R

[56] References Cited

UNITED STATES PATENTS

| | | | |
|---|---|---|---|
| 3,575,552 | 3/1971 | Grant et al. | 179/100.2 R |
| 3,644,683 | 2/1972 | Braun | 179/100.2 B |
| 3,558,142 | 1/1971 | Poessel | 274/4 |
| 1,065,135 | 6/1913 | Ivatts | 352/236 |

*Primary Examiner*—Bernard Konick
*Assistant Examiner*—Robert S. Tupper
*Attorney, Agent, or Firm*—Colton & Stone, Inc.

[57] ABSTRACT

Cue indicia applied to one or both side edges of a magnetic tape may be directly viewed through the conventional cartridge viewing window as the tape is being reeled in either direction.

The application of edge marked cue indicia may be perfomed automatically in conjunction with the recording of commercially pre-recorded tapes, automatically in conjunction with cartridge tape loading or manually in the case of home recorded tapes.

10 Claims, 10 Drawing Figures

REELABLE MAGNETIC TAPE HAVING EDGE MARKED CUE INDICIA FOR DIRECT VIEWING IN THE REELED CONDITION

BACKGROUND OF THE INVENTION

Magnetic tape cartridges of the "cassette" type met with instant public acceptance following their introduction in the early 1960's and, in the ensuing years, have created one of the largest and fastest growing industries in the world with expected sales for the year 1971 approximating upwards of one billion units. The compact unit-handled characteristic of these cartridges coupled with their excellent audio reproduction qualities, low cost and capability of being concomitantly erased and re-recorded make them ideally suited for such diverse uses as entertainment, education, business communications and the like. Although the great majority of cassette cartridge sales are of unrecorded tape for subsequent home recording by the user, there is a very substantial, and fast growing, market for pre-recorded cassettes.

A typical cartridge tape may include a double track system whereby the full tape length may be played or recorded along one-half the tape width in one direction after which time the cartridge may be reversed and the remaining half tape width played or recorded as the tape is transported in the other direction between selectively driven reels. Double track tapes of this type typically provide program lengths up to 90 minutes which, as will be apparent, may include a large number of separate recordings which are normally spaced by 10 second unrecorded, or audio pause, intervals when the tape is running at normal record or playback speed. The machines which play these tapes are provided with high speed forward and rewind controls for quickly advancing or rewinding a tape to the desired program selection and it is the fast and accurate location of the audio pause intervals immediately prior to selected ones of the plurality of recorded programs that comprises the subject matter of the invention.

Prior methods of locating audio pause intervals within the total length of recorded tape have included footage counting instrumentation requiring special equipment which is both expensive and impractical for use with cassette type cartridges; a relatively accurate but prohibitively expensive system of splicing colored pieces of plastic or paper into the tape reel; a reflection viewing system employing a movably mounted mirror to constantly reflect cue markings applied to the non-recorded tape surface through the viewing window; and the most common and least expensive but highly inaccurate system involving the placement of an index adjacent the viewing opening whereby the tape diameter may be estimated by visual comparison with the index. Because of the very high volume of cassette type cartridge sales and their relatively low selling cost it is apparent why inexpensive indexing systems are required.

Cassette type cartridge tapes are transported between their selectively driven reels with the tape recording surface facing outwardly relative to the cartridge housing and reel axes so that the recording surface will be in position to engage the playback/record and erase heads as conventionally positioned in the playback and recording machines with which the cartridges are used. Consequently, the recording surface faces outwardly as it is wound between the reels and may be seen through the conventional viewing window as the tape is being reeled in either direction. Although the placement of cue or index markings, in the form of ink, dye, paint or other like indical markings on the recording surface over the non-recorded audio pause intervals would provide an excellent method of enabling one to directly view these cue markings for the determination of a particular selection along the tape length; the presence of such markings on the recording surface would render the tape unusable for subsequent recordings since such markings diminish the recording properties of the tape. Inasmuch as the great majority of cartridge tapes are destined to be used for multiple erasures and recordings it is apparent that the presence of cue markings on the originally recorded surface is an impractical approach to the problem.

Inasmuch as any finite tape interval will never occupy the precise same radial position with respect to its supporting reel axis upon successive windings due to inherent reel and/or tape slippage and variations in winding tensions applied to the tape; it is apparent that a particular tape interval cannot be located with reproducible accuracy as a function of wound tape diameter. Such locating systems involving index markings on the cartridge housing, at best, provide nothing more than a rough estimation of tape interval locations and then only of the particular index marking to be associated with the wound reel diameter has been previously noted and recorded as on the outer cassette housing. Nevertheless, this highly inaccurate locating system is the only one presently in widespread use since it represents an acceptable compromise on the basis of cost and assembly procedures as among the aforenumerated systems. Thus, both the tape splice and reflection viewing systems provide absolute reproducible accuracy of tape interval locations since the tape, itself, is cue marked and the relationship of the marks to the desired intervals are independent of variations in reel diameter upon subsequent windings. The tape splice system, however, involves a physical alteration of the tape which is not only a fairly expensive process but renders that particular portion of the tape unsuitable for subsequent recordings while the reflection viewing system involves an alteration of cartridge assembly procedures and introduces an additional moving part thus increasing the likelihood of tape fouling.

The primary purpose of the invention is to provide a tape cueing system that combines the reproducible accuracy of the reflection viewing system with the simplicity of the index comparison viewing system while requiring no alteration whatsoever of a conventional tape cartridge and not affecting subsequent tape recording over the cue marked portions of the tape.

SUMMARY OF THE INVENTION

The location of predetermined finite tape intervals within a reel of wound tape are determined by cue markings either applied to the tape, as in the nature of a coating, or as an impregnated portion of the tape along such finite intervals to one or both side edges of the tape. The application of a plurality of such cue markings along one side of a like plurality of finite tape intervals presents an appearance of the wound reel, when viewed in elevation parallel to the axis of reel rotation, as including a plurality of concentric bands. Normally each concentric band will represent the audio pause interval between recorded selections, which recorded selections may, of course, be either audio alone or audio-visual selections.

The concentric bands are thus directly visible through the normal cartridge viewing window and one may go directly to a desired selection at fast forward or rewind speed. At the time the particular concentric band disappears from the pay-out reel, the stop button is depressed and the tape is in position to play back or record that section of tape immediately following the cue marked interval.

It is important that the cue markings be applied in such a manner that their positionment relative to each other and the unmarked portions of the tape be independent of any variations in reel diameter upon subsequent windings. This is desirably achaived by marking of the tape edge while the interval being marked is not wound on a reel.

The edge markings are, of course, applied in one or more colors contrasting with the normal tape color.

The usual 4 second audio pause interval between recorded selections of pre-recorded tapes translates to an 8 inch linear tape interval and it has been found that the edge marking of a conventional cassette tape over such an 8 inch interval presents a circular band, when the tape is reeled to include the marked portion, that is readily visible even at a distance of several feet through the cassette viewing window.

Thus, for example, in the case of a pre-recorded cassette containing six recorded selections separated by edge marked audio pause intervals, the fully wound pay-out reel would display five concentric bands; the radially outermost band indicating the pause interval between the first and second selections. The entire recorded intervals may be edge marked, if desired, using the same or different colored cue markings which may be separated by unmarked pause interval portions. This would, of course, present much larger concentric bands when viewed on a wound reel. Similarly, and as would be suspected from the foregoing, the latter portion of a recorded selection may be edge marked with the edge marking continuing into and throughout the pause interval which permits one to use the pause interval as the cueing position while yet presenting a cue band of desired band width.

The concentric bands, or cue markings, may be rendered even more visible by the positionment of a small elongated magnifying lens over the viewing window.

The application of the invention to non-recorded tape cartridges may involve either edge marking of the tape by a home user or edge marking of the tape at closely spaced, predetermined intervals at a time prior to placement of the tape in the cassette. This premarking of the unrecorded tape renders unnecessary any subsequent marking by a user which is a highly desireable feature of the invention. Thus, if the unrecorded tape be premarked at frequent intervals such as, for example, 1 minute intervals based upon normal playing speed; a user will simply advance his tape to the next cue mark after finishing one recording before commencing a subsequent recording. Each recorded selection will thus commence at one particular concentric band, or cue mark, which cue mark may be correlated with the selection title by appropriate written entry on a label applied to the face of the cassette.

In the case of pre-recorded tapes, cue indicia may be applied to a side edge of the tape contemporaneously with the conventional recording thereof at intervals along the tape length spaced as a function of the recorded interval. Similar edge marking equipment may be activated as a function of running tape length moving past the marking station to pre-mark non-recorded tape prior to its assembly with a cartridge housing. Finally, a home marking system may be employed whereby a home user may withdraw a length of tape from its cartridge and edge mark the same at any desired location.

DESCRIPTION OF THE PREFERRED EMBODIMENT

Figure 1:
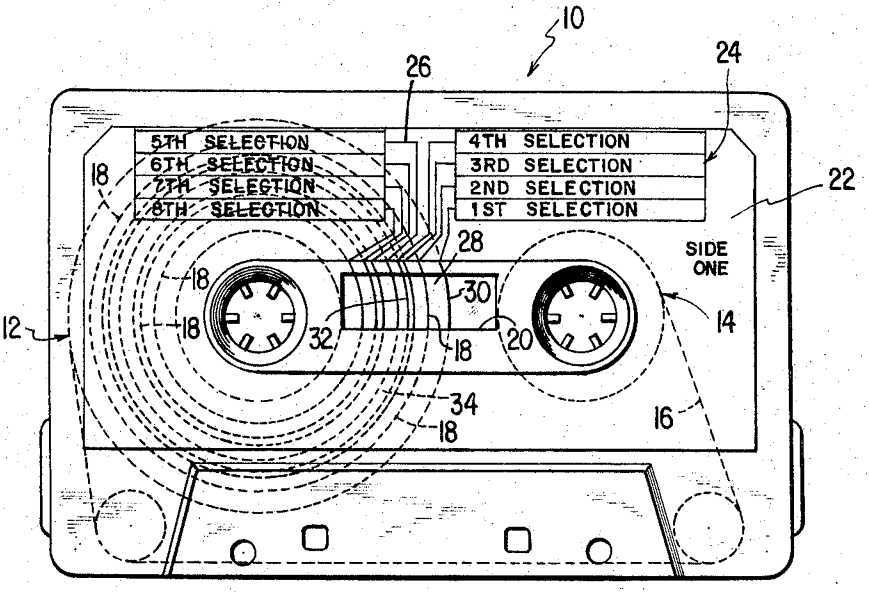
FIG. 1 is a plan view of a tape cartridge containing an edge marked pre-recorded tape.

In FIG. 1 is depicted a magnetic tape cartridge 10 including selectively driven pay-out and take-up reels 12, 14 between which a magnetic tape 16 is adapted to be transported between the illustrated fully wound position on reel 12 and a fully wound position on reel 14. A plurality of cue marks applied to a side edge of tape 16, preferably when the tape is in an unwound condition as subsequently described, define a plurality of concentric bands 18 upon viewing the wound tape parallel to the axes of reel rotation. Minor arcs of the concentric cue bands are, of course, visible exposed through the conventional viewing window 20 at all times irrespective of which reel 12 or 14 the tape is wound upon. In the particular embodiment shown in FIG. 1, each concentric band or cue marking 18 is located intermediate a recorded selction. Each recorded selection is preferably correlated with its immediately preceding cue marking 18, when considered in the direction of playback tape transport, by appropriate indicating means imprinted on the face of label 22 secured to a side of tape cartridge 10. Thus, for example, assuming eight recorded selections on tape 16; the eight selections may be written or imprinted on a selection chart 24 with a separate lead line 26 extending from each imprinted selection on chart 24 to either the outer periphery of the tape, as in the case of the first selection, or to the concentric cue band immediately preceding the second through eighth indicated selections. The indicating lead line 26 associated with the first selection, which is the radially outermost recorded selection 28 as on the fully wound reel 12 in FIG. 1, extends merely to the outer periphery 30 of the wound tape since such outer periphery is readily visible through viewing window 20. Each of the lead lines 26 associated with the remaining seven selections extend into a generally tangential alignment with a corresponding cue band immediately preceding the indicated selection.

The tape shown in cartridge 10 is in position to play the first recorded selection 28. Following a playing of this selection if it then be desired to play the fourth selection; the tape is simply advanced onto take-up reel 14, at fast forward speed, until the third cue band 32 begins to disappear from pay-out reel 12. The fast forward advance is then terminated and the tape is advanced at normal playback speed to play the fourth selection which is indicated in the reel wound condition of FIG. 1 by reference character 34.

Figure 2:
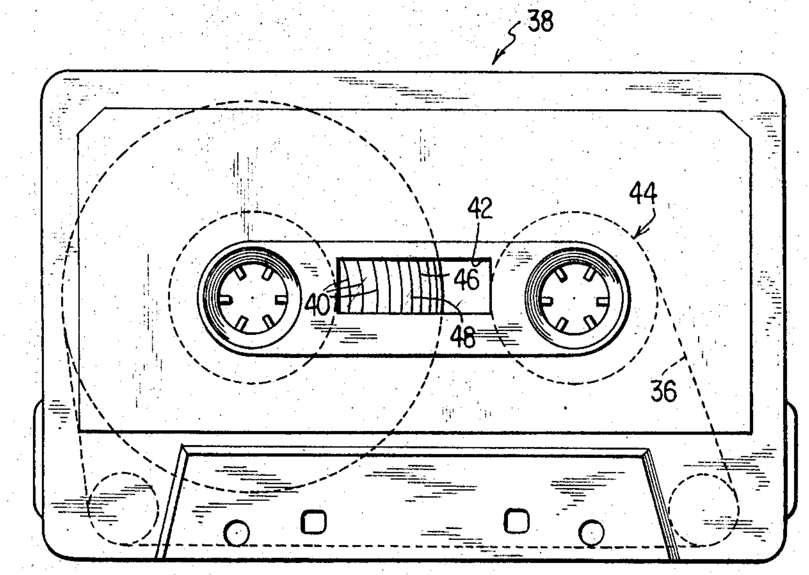
FIG. 2 is a plan view of a tape cartridge containing a non-recorded tape whose edge markings are equally spaced along the tape length.

It is, of course, apparent that one may simply count the cue bands 18 to arrive at a desired selection rather than relying on the assistance of lead lines 26 as is specifically illustrated in connection with the unrecorded tape 36 shown in FIG. 2 as housed within a cartridge 38. Tape 36 was originally edge marked along substantially equally spaced intervals along the length of the tape either by a coating operation, as subsequently described, or by a modification of the original tape manufacturing process. This latter process involves imparting a color or other indicial characteristic to the body of the tape, itself, during the manufacturing process such as by admixing or adding a dye which may extend throughout the width and breadth of the tape body over the desired equally spaced intervals. It will be apparent that if the entire width and breadth of the tape body is dye marked along those discrete intervals of the tape length which are to serve as the cue marked intervals, the color of the so dye marked or impregnated intervals will be clearly visible at the tape side edge to the same extent as would those side cue markings applied as a coating to the finished tape. A similar result is achieved if only the tape breadth is dye marked adjacent one or both side edges. The result of the edge markings spaced at equal intervals along the tape length, irrespective of whether the same be created by a coating operation on the finished tape or a coloring operation incorporated during the tape manufacturing process, is to create the concentric bands 40 which are readily visible through viewing opening 42.

In use, cartridge 38 is inserted into a conventional player/recorder and the tape advanced onto take-up reel 44 as the tape is recorded with a desired selection in conventional manner. If the recorded selection should terminate with the outer pay-out reel periphery intermediate the third and fourth cur bands 46, 48, for example, the user simply advances the tape, at fast forward speed, until the fourth cue band begins to disappear from the pay-out reel. A succeeding selection may then be recorded commencing at the fourth cue band 48. The tape may be fully recorded in a similar manner thus assuring that each selection, except the first, commences at one of the cue bands. Appropriate notations on a suitable chart or the like then permits one to go immediately, via fast rewind or fast forward speed to a desired selection.

It is important to note that both cartridges 10 and 38 are conventional in all respects and, of course, include a viewing opening on either side thereof whereby cue markings applied to either side edge of the tape may be directly observed.

It is obvious that cue bands could be applied directly to a tape side edge while the tape is in a wound condition, such as by a stencil or the like; however, the reproducible accuracy of program location would be seriously impaired due to the difficulty in locating precise tape intervals and inherent variations in subsequently wound reel diameters as previously discussed. The practicability of directly edge marking a wound reel of tape is further impaired by the difficulty in avoiding movement of the marking medium onto the recordable surface of the tape.

The tape is desirably edge marked along the appropriate intervals while the tape is in an unwound condition. It has been found that an 8 inch edge marked interval, as measured along the tape length, produces a highly visible band which is readily discernible from a distance of several feet and that this marking interval is sufficiently long to allow for user reaction time to stop the fast moving tape at the desired position. Longer marking intervals may, of course, be used which will increase the cue band width as viewed on the wound tape reel. Alternatively, the recorded intervals of the tape may be edge marked, in different colors, if desired. Irrespective of the manner in which the cue bands are applied, it will be apparent from FIGS. 1 and 2 that one may easily determine the pause interval between recorded selections by observing the disappearance or appearance of the cue bands on the pay-out and take-up reels, respectively.

Figure 3:
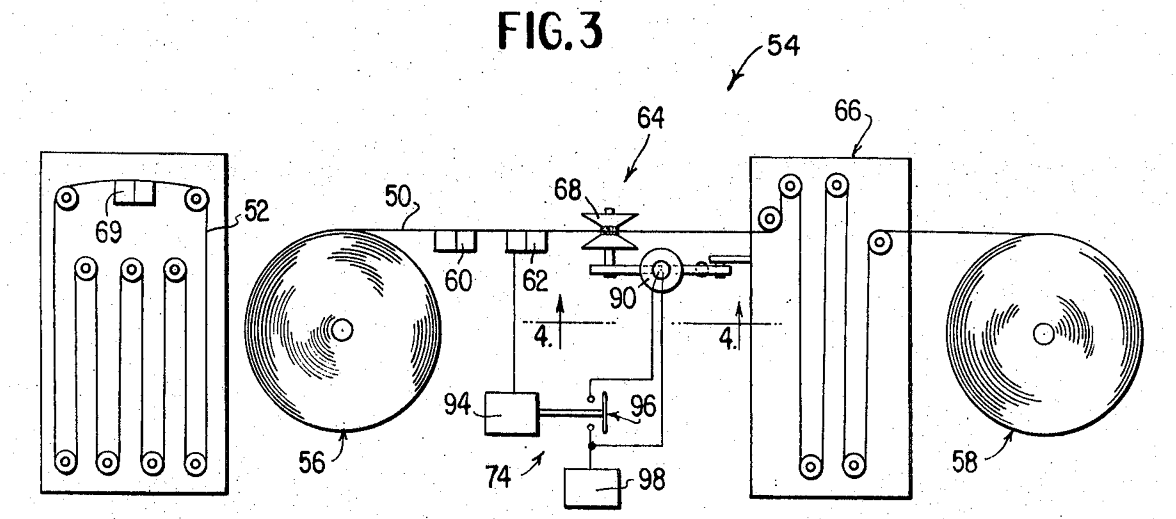
FIG. 3 is a plan schematic illustration of a system for recording and edge marking a magnetic tape.

In FIG. 3 is schematically illustrated a preferred method of commercially reocrding a magnetic tape 50 from a master tape 52 and simultaneously applying edge cue markings intermediate the recorded selections.

The preparation of the master tape is entirely conventional with the single exception that a signal outside the audible range is recorded on the master tape at the normal "pause" intervals intermediate the usual audibly recorded program selections. This may be effected in any desired manner such as by the activation of a sonic relay and low frequency record head as a function of audible signal termination as during that interval between recorded selections. Desirably, the inaudible signal will be recorded within the pause intervals at the time the master tape is prepared though it is obvious that a pre-recorded master tape may be so inaudibly recorded to convert the same into one suitable for the practice of the invention. Although a single slave tape 50 is illustrated as being recorded and edge marked in accordance with the invention, it will be understood that a plurality of slave tape record and marking stations 54 are normally associated with a master tape 52 to produce a multiplicity of edge marked slave recordings at the same time. It will be further obvious that the presence of the inaudible signal on the master tape in no way affects its use in a conventional slave recording system where the cue marking is not applied.

Figures 4, 5:
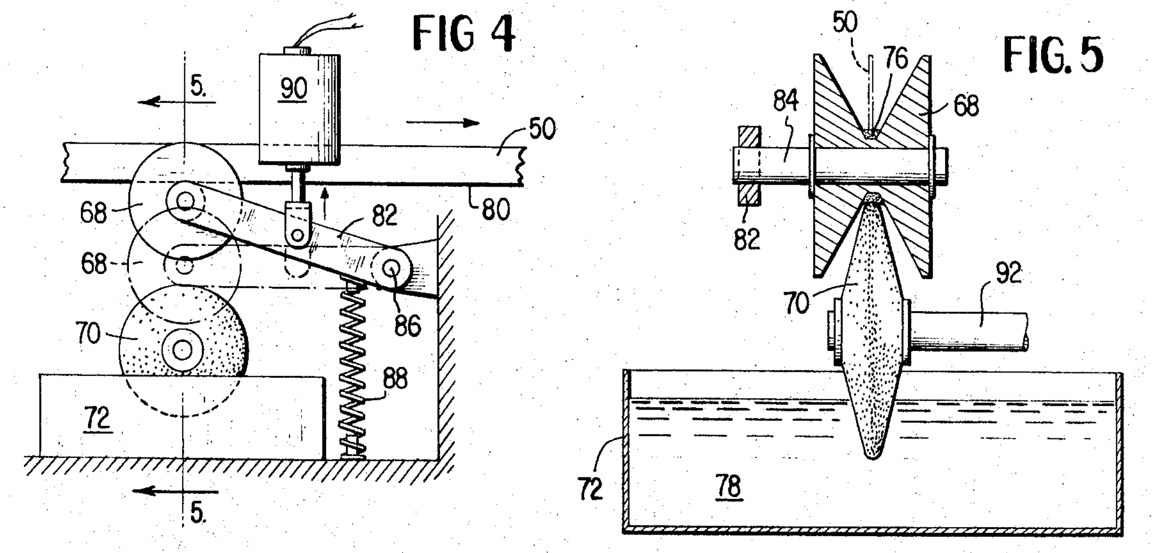
FIG. 4 is a fragmentary elevational view of the marking station taken along line 4—4 of FIG. 3.
FIG. 5 is a sectional view taken along line 5—5 of FIG. 4 but with the printing roller shown in a lower non-printing position.

The record and marking station 54 includes supply pay-out and take-up reels 56, 58 for the continuous seriatim transport of tape 50 past record, sensing, marking and drying stations 60, 62, 64, 66. A suitable length of master tape 52 is transported in any desired manner past a playback head 69 which is suitably connected, in a manner not illustrated in the drawings, with the slave tape record head 60. The usual synchronized, high speed transport of the slave and master tapes thus results in the duplication of the master tape recording on the slave tape which, in the case of the instant invention, also results in the recording of the inaudible signal at the pause intervals on the slave tape 50. One specific illustration of the manner in which these inaudibly recorded pause intervals may be used to insure that a side edge of the tape 50 is visibly marked is shown in FIGS. 4–5. In a broader sense, any desired manner of sensing the pause interval between recorded selections could be used to activate the marking means.

Basically, as tape 50 is transported, program selections are recorded thereon at record head 60 as are the inaudible recordings between the audibly recorded selections. When one of the inaudibly recorded intervals passes over sensing station 62, in the form of a limited sensitivity play back head which is responsive to the inaudible signal, a sonic relay is acitvated which, in turn, initiates a marking operation at the marking station to visibly mark a side edge of tape 50 at the particular pause interval detected at the sensing station. When sensing head 62 no longer detects the inaudible signal, as when another audibly recorded selection is passing there-across, the sonic relay and marking station are deactivated. Assuming for simplicity of illustration the recording and cue marking of a single track tape, one manner in which the foregoing is accomplished will become apparent from the following detailed description of FIGS. 3–5 wherein the tape 50 moves from left to right as viewed in FIG. 3.

The marking station is illustrated substantially in its entirety in FIGS. 4 and 5 and includes a rotatable Vee printing roller 68, and inking transfer roller 70, a printing ink reservoir 72 and a printing control assembly 74.

Vee printing roller 68 includes a small wicking pad 76 or other porous material, positioned at the apex of the Vee roller, through which the particular printing ink 78 being used will migrate by capillary action. It will be apparent that a side edge 80 of tape 50 is adapted to come into marking contact with the porous pad 76 during its transport across marking station 64. This marking position of the printing roller 68 relative to tape side edge 80 is clearly shown in FIG. 4 and the cross sectional relationship of the tape to the printing roller is indicated in FIG. 5 wherein the phantom line showing of tape 50 illustrates the manner in which the side edge of the tape would be drawn across pad 76. It will be understood that in the printing roller position of FIG. 5, which corresponds to the lower pahntom line position of FIG. 4, the path of tape transport lies above the printing roller.

It is important that the printing ink not be applied to the recorded surface of tape 50 at a distance of more than a few thousanths of an inch from the side edge 80. Accordingly, the density of porous material 76 is chosen to insure that the cutting action of tape edge 80 moving thereacross does not cut into the pad. Alternatively, wicking pad 80 could be made of "Porax" which is a porous metal or the ink could simply be applied via a steel roller portion rather than the porous pad.

Printing roller 68 is rotated in any desired manner which may comprise a small constantly driven electric motor, not shown, mounted on roller support arm 82 and geared to or directly driving printing roller shaft 84. Although a somewhat better marking action is achieved when the linear speed of marking pad 76 is different from the linear speed of tape 50, the reduction in wear on the tape edge 80 and pad 76 makes it desirable to match the linear speeds of the marking pad and tape.

Roller support arm 82 is mounted for pivotal movement between the phantom and solid line positions of FIG. 4 about the axis of a fixed pivot 86 under the combined influences of gravity, a compression spring 88 and a solenoid operator 90 which is interconnected between fixed structure, not shown, and roller support arm 82. The bias of compression spring 88 is selected to be insufficient to oppose the downward movement of roller support arm 82 to the position of FIG. 5 by gravity. The purpose of spring 88 is simply to reduce the power requirements of solenoid 90 to move the printing roller upwardly to the tape edge printing position. Inking transfer roller 70 is freely rotatable on its shaft 92 and is frictionally driven by printing roller 68 in the position of FIG. 5.

Solenoid operator 90 is activated to raise the printing roller to a tape edge printing position by the circuit shown in FIG. 3 wherein sonic relay 94 is activated by the inaudible signal picked up at sensing station 62 to close switch 96 and bring power supply 98 in circuit with the solenoid. It will be recalled that the inaudible signal is recorded on tape 50 at record station 60 during the interval between recorded selections. Printing roller 68 is thus elevated to the tape edge printing position of FIG. 4 to cue mark tape edge 80 over that interval during which the inaudible signal is received at sensing station 62. When the inaudible signal is terminated as by a recorded selection passing sensing station 62, sonic relay 94 is deactivated and switch 96 is opened to break the energizing circuit to solenoid 90. Printing roller support arm 82 then pivots downwardly under the influence of gravity to effect a frictional driving engagement between the constantly rotating printing roller 68 and transfer roller 70 to again ink pad 68 in preparation for the next marking cycle. After passing across the marking station, tape 50 is passed through drying station 66 prior to the time the recorded and edge marked tape is reeled on master supply reel 58 from whence it will subsequently be drawn for assembly with a tape cartridge of the type shown in FIG. 1, for example. Take-up and supply reels 56, 58 are, of course, supported on generally horizontal supports of any desired type when oriented as shown in FIG. 3 and the tension of tape 50 may be maintained by the addition of desired tensioning rollers. Alternatively, if the orientation of reels 56, 58 be displaced 90° from the position of FIG. 3, additional idle rollers would be employed to alter the path of tape travel across marking station 64 so that tape 50 is substantially vertically oriented at the time of its engagement with printing roller 68.

Figures 6, 7, 8:
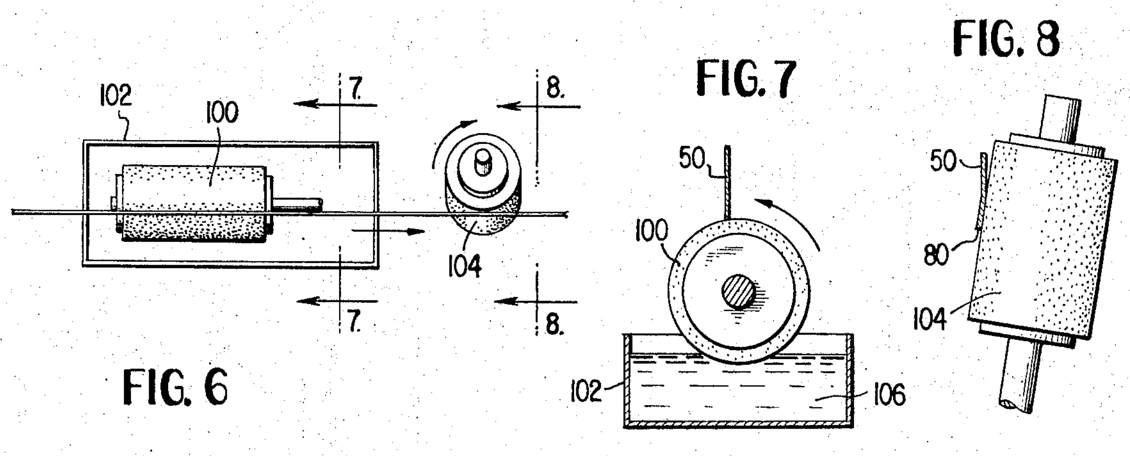
FIG. 6 is a fragmentary plan view of marking station apparatus that may be substituted for that shown in FIG. 5.
FIG. 7 is a sectional view taken along line 7—7 of FIG. 6.
FIG. 8 is a sectional view taken along line 8—8 of FIG. 6.

In FIGS. 6–8 is schematically illustrated an alternate edge marking system which may be substituted for that shown in FIG. 3. A marking roller 100 is constantly rotated about an axis generally parallel to the path of tape travel and is supported for limited movement into and out of the marking engagement with the tape edge 80. In the embodiment of FIGS. 6–8, the inking fountain 102 is mounted for movement along with marking roller 100 as by being supported on the same solenoid controlled support arm therewith generally after the manner described in connection with the support arm 82 of FIG. 4. Thus, roller 100 is constantly rotated by a motor, not shown, and is in constant inking engagement with fountain 102. The fountain and roller are moved vertically as a unitary assembly between the marking position of FIG. 7 and a lower position vertically spaced from tape edge 80. A constantly driven cleaning roller 104 is preferably mounted for continuous engagement with the non-recordable surface of tape 50.

In the tape edge marking position of FIGS. 6–8, printing roller 100 rotates in a counterclockwise direction, as viewed in FIG. 7, to apply ink 106 to the tape edge 80 while the tape is acting, in effect, as a doctor blade to remove ink from the roller. This is to insure that the tape edge is well marked and the excess ink tends to accumulate on the non-recordable surface of the tape from which it is removed, at least in part, by the subsequent passage of the tape into engagement with cleaning roller 104 which rotates in opposition to the direction of tape transport therepast. It is not necessary that cleaning roller 104 remove all the ink accumulated on the back or non-recording surface of tape 50 but simply that the ink on the back surface be smoothed to a thin film which does not affect tape fidelity. The relationship of parts shown in FIG. 7 assures that no ink may reach the recording surface of the tape. The cleaning roller 104 may be supplied with a solvent for the ink to completely remove the same from the back surface of the tape, if desired.

It is obvious that non-recorded tapes may be premarked at regular or irregular intervals with but slight modification of the equipment shown in FIG. 3 wherein any conventional footage counter could be utilized to activate switch 96. Alternatively, the precise same apparatus of FIG. 3 could be used to pre-mark unrecorded tape by simply omitting the audible recording on master tape 52. In other words, the master tape would be prepared containing only those spaced recordings to which sonic relay 94 responds.

Figure 9:
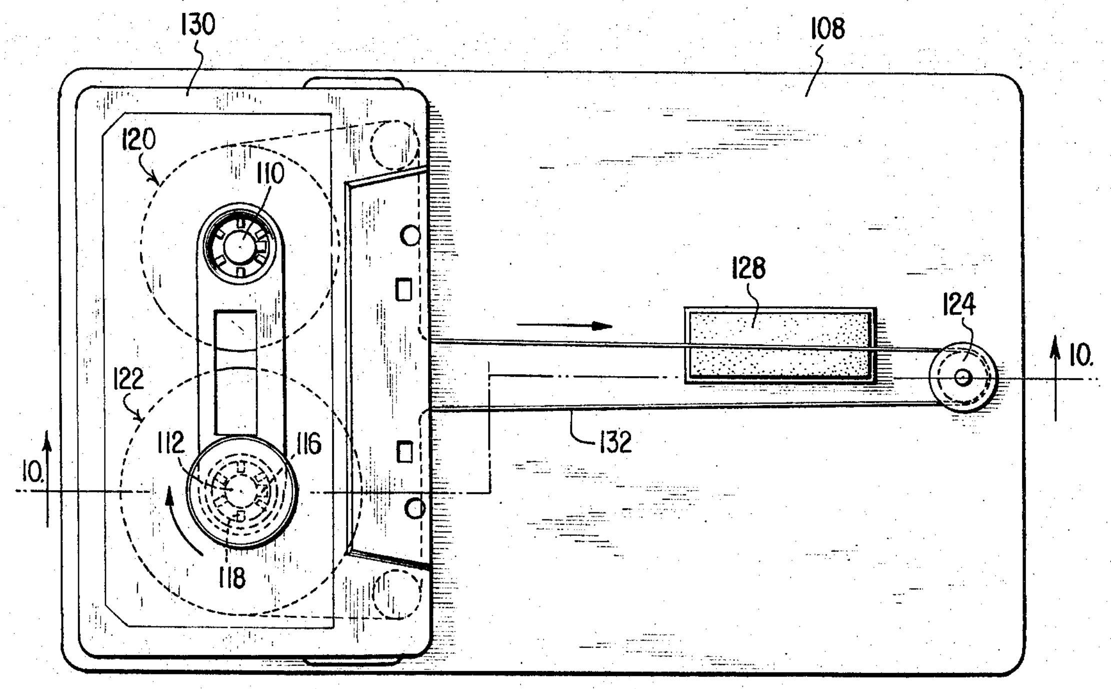
FIG. 9 is a plan view of a home edge marking system.
Figure 10:
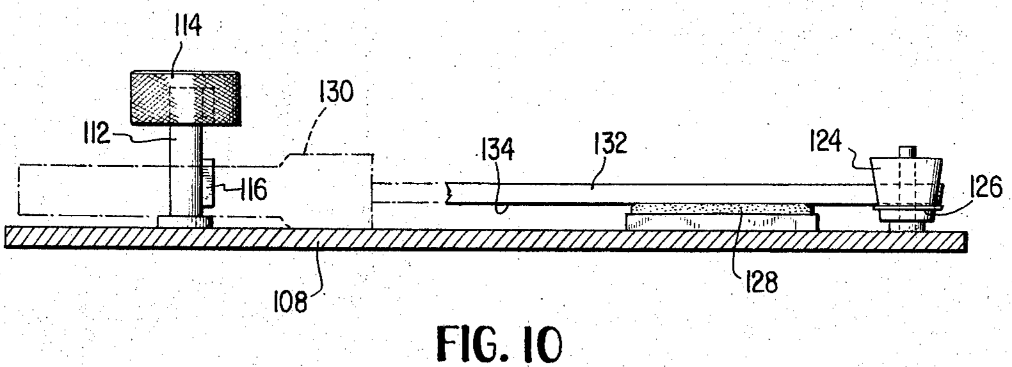
FIG. 10 is a sectional view taken along line 10—10 of FIG. 9.

One manner in which non-recorded tapes may be marked by a home user is illustrated in FIGS. 9 and 10. A base 108 provides a frictionally biased rotatable support for a spindle 110 and a freely rotatable support for a spindle 112. A knurled hand knob 114 is removably keyed to the upper end of spindle 112 and both spindles are provided with keys 116 for removable interengagement with the conventional key elements 118 on the cartridge reels 120, 122. A cone shaped idler 124 having a small tape edge engaging flange 126 is positioned at an end of base 108 remote from spindles 110, 112 and adjacent an inking pad 128.

In use, the tape cartridge 130 is placed in a conventional record/playback machine and the first selection is recorded in conventional fashion with the tape 132 moving from the pay-out reel 120 onto the take-up reel 122. After the first selection is recorded, cartridge 130 is removed from the machine, turned over so that its opposite side faces downwardly, and placed on spindles 110, 112. The knurled hand knob 114 is then engaged with take-up spindle 112. While holding knob 114 to preclude any of the tape containing the recorded selection from being withdrawn from the take-up reel 122; the point of a pencil is inserted in the conventional opening at the base of cartridge 130 where the conventional record/playback head engages the tape and a loop of tape is withdrawn. Due to the fact that take-up reel 122 is held stationary by the user, the loop of tape is necessarily drawn from the pay-out reel containing the non-recorded portion of the tape. The natural lay of the tape as so withdrawn is, of course, vertically oriented as shown in FIGS. 9 and 10. The loop of tape is then reeved over cone shaped roller 124 and comes to rest with its lower side edge against roller flange 126 with the lower side edge 134 of the tape resting on the surface of inking pad 128. Knob 114 is then rotated to rotate take-up reel 122 clockwise to withdraw more tape from the pay-out reel which passes to the take-up reel via printing pad 128 and roller 124. This unwinding movement of the tape from pay-out reel 120 is resisted by the frictionally biased rotatable mounting of spindle 110 which tensions the tape. The tension thus applied to the tape coacts with the downward taper of roller 124 to continually bias the tape downwardly against inking pad 128 and roller flange 126. After a suitable interval of tape has been edge marked by movement across inking pad 128, the tape loop is removed from roller 124 and rewound into cartridge 130. Thereafter, the cartridge is then again reversed so that the backside, as shown in FIG. 9, is again facing upwardly and the cartridge is replaced in the machine for a subsequent recording.

We claim:

1. In combination with a recordable web wound on a rotatable reel, the improvement comprising; means for visually locating desired segments of the total tape length in the wound condition of the tape during winding and unwinding of the tape from the reel including a plurality of cue markings along, and confined substantially only to, a side edge of said wound web defining a plurality of circular bands substantially concentric with the axis of rotation of said rotatable reel; and each said circular band being radially spaced from a next adjacent band by an unmarked length of said web side edge whereby each spaced cue band comprises a cue reference mark relative to and contrasted with the adjacent unmarked web length, the appearance and disappearance of said circular bands during winding and unwinding respectively comprising an indication of the desired segment.

2. The combination of claim 1 wherein said cue markings are substantially equally spaced along the length of said web.

3. The combination of claim 1 wherein said recordable web includes a plurality of recorded intervals spaced by non-recorded intervals along the length thereof; and different ones of said cue markings associated with different ones of said intervals.

4. The combination of claim 1 wherein said cue markings are associated with at least some of said non-recorded intervals.

5. The combination of claim 4 wherein said cue markings are associated with at least some of said recorded intervals.

6. A reeled web having means for visually locating desired segments of the total tape length in the wound condition of the tape during winding and unwinding thereof; said locating means comprising a plurality of indicially marked portions spaced along the length of the web and integral with the remainder of said web; said web including a recordable surface, an opposed surface and opposite side edges; said indicially marked portions being exposed along at least one of said side edges and separated by visually contrasted portions of said one side edge whereby said reeled web presents concentric bands defined by the exposed portions of said marked portions, distinguished from said visually contrasted portions, along at least said one side edge, the appearance and disappearance of said concentric bands during winding and unwinding respectively comprises a visual indication of the desired segment; and said indicially marked portions being confined substantially only to the side edge of the web.

7. The reelable web of claim 6 wherein said remainder of said web is of substantially a single color; and said indicially marked portions are a contrasted color.

8. The reelable web of claim 6 wherein said indicially marked portions comprise a finite tape interval having a color characteristic distinct from said remainder of said web; and said color characteristic extending into the body of said web.

9. The reelable web of claim 6 wherein said indicially marked portions extend throughout the width and thickness of said web.

10. A reeled tape of the type comprising a reel and a magnetic tape wound thereon of substantially uniform thickness throughout the length thereof and having a recordable surface of substantially uniform record and playback fidelity throughout the length thereof, the improvement comprising; means for visually locating desired segments of the total tape length in the wound condition of the tape during winding and unwinding of the tape from the reel; said means comprising a plurality of spaced indicial marking positioned intermediate the length of said tape along and confined substantially only to a side edge thereof; the length of each said indicial marking exceeding the circumference of its wound position on the reel; and said indicial markings being spaced along the length of said tape by unmarked tape segments whose length is great in comparison to the length of said indicial markings.

* * * * *